United States Patent
Sukonik et al.

(10) Patent No.: US 6,243,802 B1
(45) Date of Patent: Jun. 5, 2001

(54) APPARATUS AND METHOD FOR ENCRYPTED INSTRUCTIONS

(75) Inventors: Vitaly Sukonik, Hadera; Alexander Grobman, Netanya; Neri Baron, Tel Aviv, all of (IL)

(73) Assignee: Motorola Inc., Schaumburg, IL (US)

( * ) Notice: Subject to any disclaimer, the term of this patent is extended or adjusted under 35 U.S.C. 154(b) by 0 days.

(21) Appl. No.: 09/263,354

(22) Filed: Mar. 5, 1999

(30) Foreign Application Priority Data

Mar. 27, 1998 (EP) .................................................. 98105602

(51) Int. Cl.[7] ........................................................ G06F 9/22
(52) U.S. Cl. .................................................................. 712/205
(58) Field of Search .................................. 712/208, 205, 712/200

(56) References Cited

U.S. PATENT DOCUMENTS 4,620,275 * 10/1986 Wallach et al. .......................... 712/6
5,012,403   4/1991 Keller et al. ........................ 364/200

FOREIGN PATENT DOCUMENTS

WO 80 02755   12/1980 (WO) .............................. G06F/13/00

OTHER PUBLICATIONS

Patent Abstracts of Japan, vol. 018, No. 153 (P–1709), Mar. 14, 1994 & JP 05 324314 A (Hitachi LTD), Dec. 7, 1993.
J. Wang et al "The feasibility of using compression to increase memory system performance". Mascots 94, proceedings of international workshop on modeling, analysis and simulation of computer and telecommunication systems, Jan. 31, 1994–Feb. 2, 1994, pp. 107–113.
Breternitz M J R et al, "Enhanced compression techniques to simplify program decompression and execution", Proceedings. International conference on computer design VLSI in computers and processors, Austin, Texas, USA, Oct. 12–15, 1997, IEEE, pp. 170–176.

* cited by examiner

*Primary Examiner*—David Y. Eng
(74) *Attorney, Agent, or Firm*—Robert L. King

(57) ABSTRACT

Computer instructions are stored in a main memory in encrypted or coded form, e.g., to conserve memory space. The coded instructions are decoded prior to execution. A temporary memory is provided to store, preferably, the last N decoded instructions. When an interrupt occurs and a refetch operation is required, a controller retrieves the desired instruction from the temporary memory already in decoded form. Thus, it only need be decoded once although used multiple times. The temporary memory can be much smaller than the main memory. Processing speed is enhanced while still conserving main memory space by coded instructions.

9 Claims, 3 Drawing Sheets

US 6,243,802 B1

APPARATUS AND METHOD FOR ENCRYPTED INSTRUCTIONS

FIELD OF THE INVENTION

The invention concerns an apparatus and method for encrypted instructions, especially during refetch operations.

BACKGROUND OF THE INVENTION

Central processing units (CPU's) of computer systems usually have address registers to store the addresses of the last A instructions read by the CPU. If there is a need to refetch one of the last A instructions, the address of this instruction is sent to the memory, causing the instruction to be refetched to the CPU. Often, an instruction is refetched if it causes an exception; the exception can be an error, unusual condition, or an external signal that sets a CPU status bit and thereby causes an interrupt.

There is a need to store information, i.e., data and instructions, in coded or ciphered or encrypted form. This can arise because of a desire to make the information opaque to unintended users or to conserve memory space through some means of redundancy elimination or compaction coding or for other reasons.

Storing information in coded or encrypted form causes several problems, among which is the need to decode the information when it is retrieved from the memory when it is to be processed by peripherals or other units that can only handle plain language (i.e., decoded) information. When coded information must be refetched there is a need to decode it again, thereby causing a waste of time and degradation of system performances.

A further problem occurs when a peripheral that is not connected to the output of the decoder needs information held in memory in coded form. This peripheral cannot directly read or process the coded information.

These problems are especially acute when information is refetched, because processing time is usually more critical in refetch operations, e.g., when an interrupt has occurred. For example, if an instruction causes an exception, so that an address of an instruction is refetched from a CPU address register, the refetched instruction will still be in coded form if it is refetched directly from memory and sent to, for example, a Load/Store unit within the CPU.

Accordingly, there is a continuing need for improved methods and apparatus for handling refetch operations and other operations where coded or encrypted information must be used multiple times.

As used herein the word "information" is intended to include any type of data or instructions or both. As used herein, the words encode, encrypt, encipher, and the words decode, decrypt and decipher, and related forms, are intended to include any form of coding for any purpose, including but not limited to obscuring meaning, compaction to occupy less space or transmission time, or any other information processing technique. The words encode, encipher and encrypt are intended to have the same meaning, and likewise for their inverse forms, e.g., decode, decipher and decrypt.

DETAILED DESCRIPTION OF THE DRAWINGS

An advantage of the present invention is that it provides a efficient, apparatus and method for storing and accessing coded information, especially instructions and other information stored in memory which need to be refetched.

Figure 1:
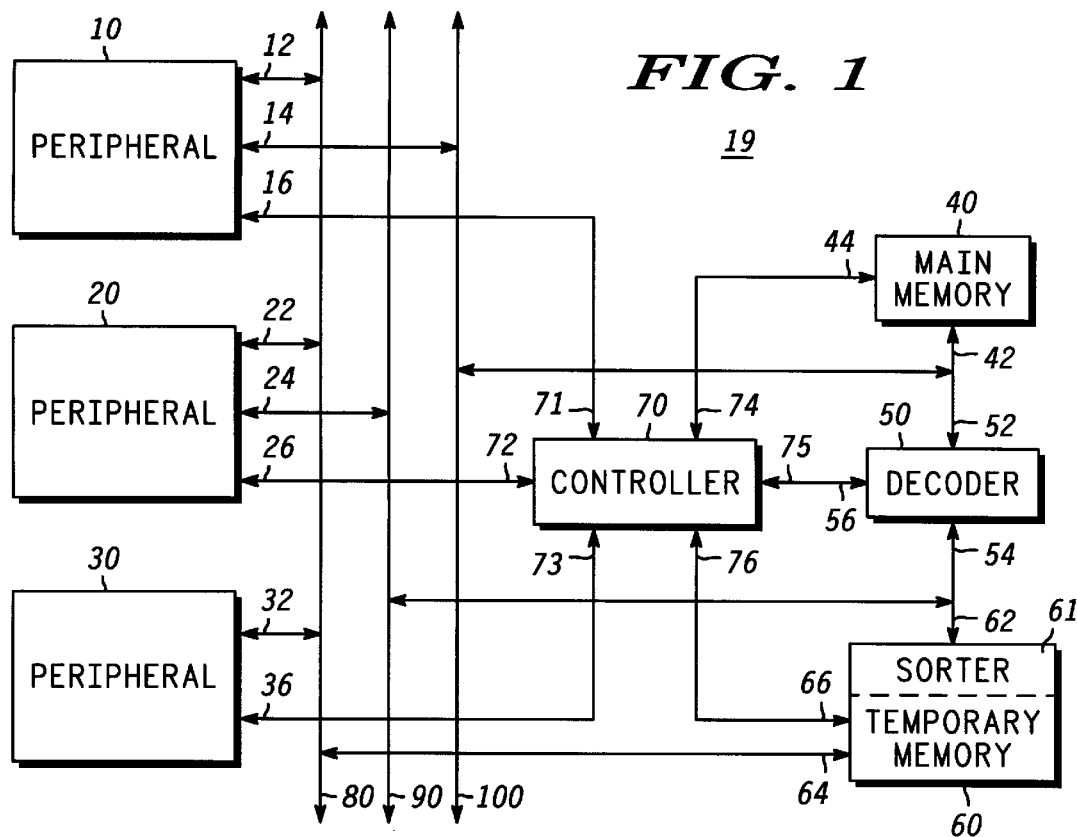
FIG. 1 is a schematic diagram of an apparatus for storing and retrieving coded information, according to a first embodiment of the invention.

FIG. 1 is a schematic diagram of apparatus 19 for storing, retrieving and processing ciphered or coded information, especially ciphered or coded instructions, according to a first embodiment of the invention.

Apparatus 19 comprises main memory 40, having inputs/outputs (i.e.—I/O's) 42, 44; coding unit (e.g., decoder) 50 having I/O 52, output 54 and I/O 56; temporary storage memory (i.e.—TSM) 60, having input 62, I/O's 64,66; and peripherals 10, 20, 30 having I/O's 12–16, 22–26 and 32,36 respectively; and controller 70 having I/O's 71–76. Main memory 40 contains M words and TSM 60 contains N words where N<M and M and N are conveniently integers. TSM 60 optionally contains sorter 61.

The words stored in TSM 60 are, conveniently (but not essentially) sorted by sorter 61 so that N words read from main memory 40 and decoded are stored in TSM 60 in decoded form. The content of TSM 60 is preferably constantly updated as information is read from main memory 40. In this context, "decoded" and "plain language" are to be understood as a form wherein the peripheral or instruction processor to which the instruction is addressed can interpret the instruction.

The function of sorter 61 is to select from the stream of M instructions being fetched from main memory 40 and decoded by decoder 50, a subset of N instructions which have a significant probability of being refetched. For example, sorter 61 can select instructions that have a high probability to cause refetch by comparing successive instructions with a predetermined list of instructions likely to cause interrupts. Alternatively, sorter 61 can merely select the N most recently decoded instructions using, for example, a simple N-high push down (FIFO) stack. The exact form of sorter 61 will depend upon the particular instructions desired to be executed and the nature of the instructions most likely to be refetched. Based on the disclosure herein, selecting the appropriate implementation of sorter 61 is within the competence of persons of skill in the art.

While cipher unit 50 is referred to herein as a "decoder", this is merely for convenience of explanation and those of skill in the art will understand that it can perform both coding and decoding in order to place information into main memory 40 in coded form and to convert coded information in main memory 40 into decoded form for storage in TSM 60 and for use in other portions of apparatus 19.

It is often the case in real time applications, that the instructions in main memory 40 are fixed program instructions and that main memory 40 is a PROM or EPROM type of memory. In these circumstances main memory 40 is loaded with instructions already in coded form and decoder 50 can be optimized for decoding speed.

Apparatus 19 includes first bus 80, second bus 90 and third bus 100 coupled to peripherals 10, 20, 30, to main memory 40, to decoder 50, to TSM 60 and to controller 70. Controller 70 has I/O 71 coupled to I/O 16 of first peripheral 10, I/O 72 coupled to I/O 26 of second peripheral 20, I/O 73 coupled to I/O 36 of third peripheral 30, I/O 74 coupled to I/O 44 of main memory 40, I/O 75 coupled to I/O 56 of decoder 50, and I/O 76 coupled to I/O 66 of TSM 60. I/O 42 of main memory 40 is coupled to third bus 100, to input 52 of decoder 50 and to I/O 12 of first peripheral 10. Output 54 of decoder 50 is coupled to I/O 62 of TSM 60, to second bus 90 and to I/O 22 of second peripheral 20. I/O 64 of TSM 60 is coupled to first bus 80, to I/O 32 of third peripheral 30, to I/O 22 of second peripheral 20 and to I/O 12 of first peripheral 10.

First peripheral 10, can read and process coded information sent (e.g., via bus 100) from output 42 of main memory 40 or decoded information sent from output 64 of TSM 60. Second peripheral 20 can read and process decrypted information sent from output 54 of decoder 50 or from output 64 of TSM. Third peripheral 30 can read and process information sent from output 64 of TSM 60. Peripherals 10, 20, 30 represent any desired electronic apparatus (including a CPU) that need to communicate with memory 40.

Controller 70 controls the read and write into main memory 40, and into TSM 60. Controller 70 conveniently controls data transfer between first peripheral 10, second peripheral 20, third peripheral 30, decoder 50, TSM 60 and main memory 40. Controller 70 works according to well known communication protocols and can be interrupted by one of the devices when there is a need to read or write to that device. It can also scan in a predetermined manner, units 10–60 in order to decide if they need to read or write information to memory 40 or 60.

For example, suppose that first peripheral 10 wants to read decoded information stored in TSM 60. The address of this information appears on I/O 14 of first peripheral 10. First peripheral 10 indicates, through I/O 16, that it wants to read the information and controller 70 enables first peripheral 10 to output the address, via I/O 14, to first bus 80. Controller 70 notifies TSM 60, that this address is available on first bus 80. TSM 60 then reads this address, via I/O 64, and notifies controller 70 via I/O 66 that it is ready to output the desired information, via I/O 64. Controller 70 enables TSM 60 to send the information via I/O 64 to first bus 80, and notifies first peripheral 10 that the information is available on first bus 80. First peripheral 10 reads the information on first bus 80 via I/O 14 and notifies controller 70 when the read operation is complete.

Those who are skilled in the art will understand that controller 70 can be coupled just to some or all of units 10–60 in order to control information flow between these units. There can also be other units or peripherals (not shown) not coupled to controller 70 but which have control outputs and inputs of their own, and that information can be written to them or read from them.

When an information word appears at output 54 of decoder 50 it is written to TSM 60, according to control signals sent by controller 70. In the preferred embodiment the N last information words retrieved from main memory 40 and deciphered by decoder 50 are stored in N memory words in TSM 60.

If one of peripherals 10, 20, 30 wants to read one of the last N deciphered information words, controller 70 sends a control signal to TSM 60, through I/O 64 indicating which of the N stored information words should be output by TSM 60. TSM 60 sends the chosen information word through I/O 64 to requesting unit 10, 20 or 30. TSM 60 allows quick reading of an information word stored in main memory 40 in coded form, without a need to decode it more than once, provided it is within the N words stored in TSM 60.

Thus, TSM 60 in combination with controller 50 and memory 40, provides rapid refetch in decoded form of previously fetched instructions that are within, e.g., the last N fetched instructions. There is no need to retrieve them directly from main memory 40 and decode them another time for the refetch operation.

Figure 2:
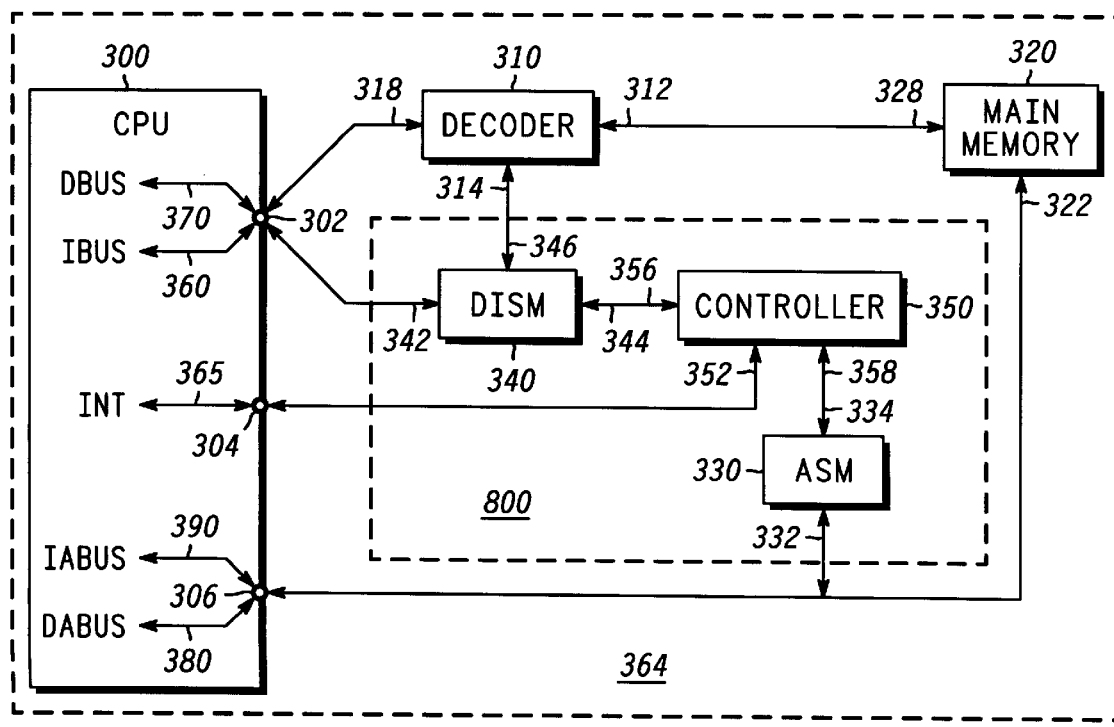
FIG. 2 is a schematic diagram of an apparatus for storing and retrieving coded information, according to a preferred embodiment of the invention.
Figure 3:
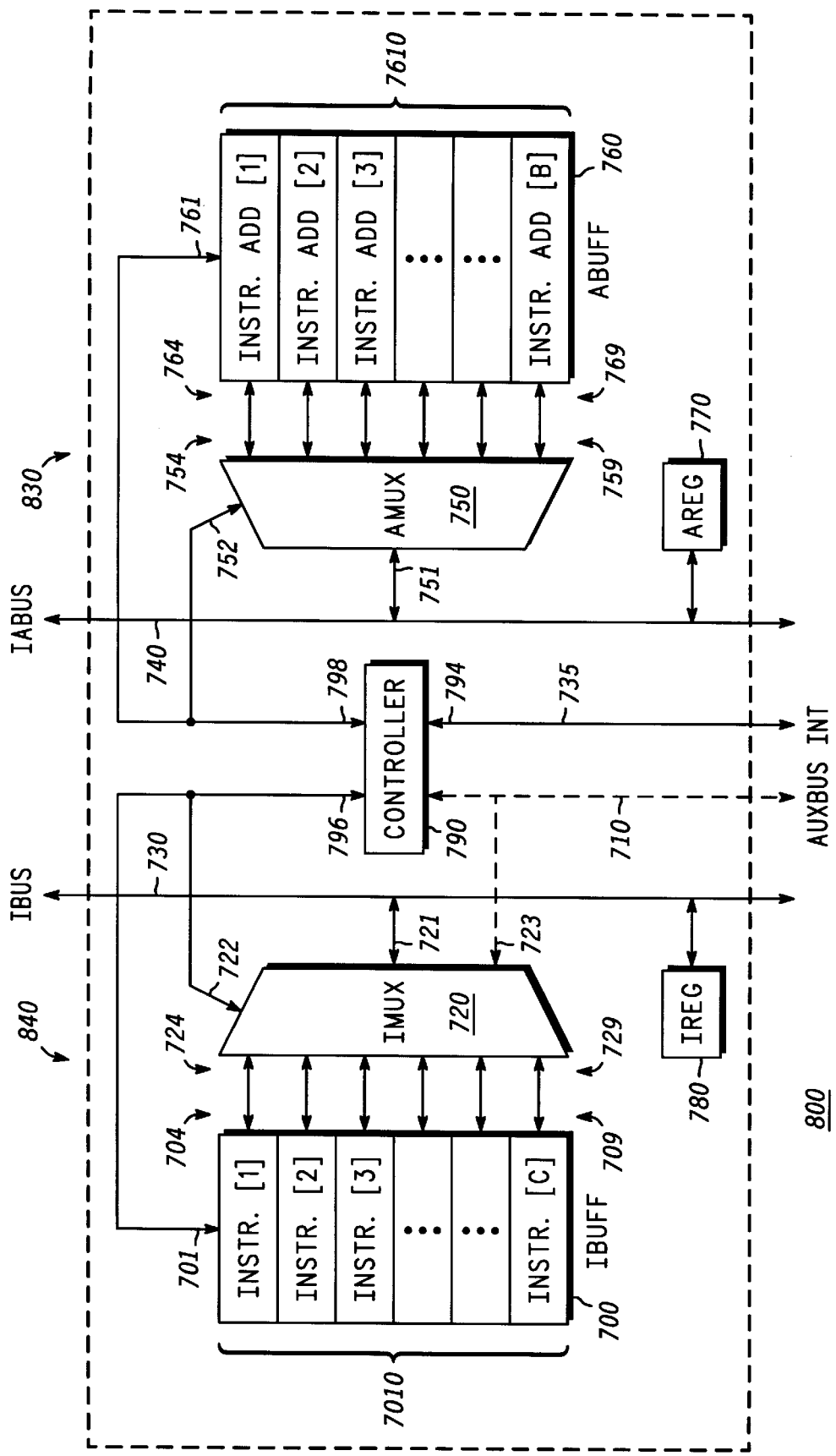
FIG. 3 is a simplified schematic diagram of a portion of the apparatus of FIGS. 1–2 showing further details.

Double headed arrows are used in FIGS. 1–3 on the communication lines and buses between the various elements to indicate that even though a port's primary function can be as an input or output, bidirectional communication can occur for hand-shake, acknowledgment and other purposes.

FIG. 2 is a simplified schematic diagram of apparatus 21 for storing and retrieving ciphered information, according to a preferred embodiment of the invention. Apparatus 21 comprises CPU 300, having CPU data bus (i.e.—DBUS) 370, CPU instruction bus (i.e.—IBUS) 360, CPU data address bus (i.e.—DABUS) 380, CPU instruction address bus (i.e.—IABUS) 390, interrupt control line or bus (i.e., INT) 365, and address I/O port 306, interrupt I/O port 304 and information I/O port 302.

Address storage memory (i.e. ASM) 330 has I/O 332 and input 334. Controller 350 has I/O's 352, 356, 358. Decoder 310, has input 312 and outputs 314, 318. Main memory 320, has input 322 and output 328. Decrypted Instruction Storage Memory (i.e.—DISM) 340, has I/O's 342, 344 and input 346. Each of DISM 340, ASM 330, controller 350, decoder 310 and memory 320 can be implemented separately or within CPU 300, or on the same chip as CPU 300, as indicated by dashed line 364, but this is not essential to the present invention.

Output 328 of instruction main memory 320 is coupled to input 312 of decoder 310. Output 318 of decoder 310 is coupled to IBUS 360. Output 314 of decoder 310 is coupled to input 346 of DISM 340. I/O port 342 of DISM 340 is coupled to IBUS 360. IBUS 360 is conveniently coupled to such units through information I/O port 302 of CPU 300. I/O 332 of ASM 330 is coupled to IABUS 390, for example, through address I/O port 306 of CPU 300. I/O port 358 of controller 350 is coupled to input 334 of ASM 330. Output 356 of controller 350 is coupled to input 344 of DISM 340. I/O 352 of controller 350 is coupled to INT bus or line 365 of CPU 300 via CPU port 304. Input 322 of main memory 320 is coupled to IABUS 390.

The address of each instruction that is to be read by CPU 300 is written to ASM 330. ASM 330 stores the addresses of the last B instructions that are read by CPU 300. Each instruction that is read by CPU 300 is written to CPU port 302 and DISM 340. The instructions can reach DISM 340, for example, directly via DISM input 346 or via CPU 300 from CPU port 302 and DISM I/O 342. Either arrange is useful.

DISM 340 stores the last C instructions (or other data) that are read by CPU 300 where C is less than or equal to B and B and C are preferably integers. Controller 350 sends control signals to DISM 340 and ASM 330, through outputs 356 and 358 respectively. Preferably, but not essentially, consecutive instructions are stored in consecutive order in DISM 340.

If there is a need to refetch an instruction, the instruction is fetched from DISM 340. Preferably, an instruction is refetched if it was executed by the CPU 300 and caused an exception (e.g., an interrupt). Controller 350 conveniently receives an input from CPU interrupt line or bus 365 via CPU port 302 and controlled I/O port 352 indicating that an instruction needs to be refetched. Controller 340 then sends a control signal to DISM 340 via I/O's 356, 344 causing the refetched instruction (out of the C instructions stored in DISM 340) to be sent from DISM 340 to IBUS 360 via I/O's 342, 302. The refetch instruction address is conveniently provided from ASM 330, but as will be understood by those of skill in the art, other convenient means of identifying the refetch instruction can also be used. For example, the refetch instruction address can be sent by CPU 300 to controller 350 via ports 304 or 306.

Controller 350 can also send a control signal to ASM 330 causing an instruction address to be outputted to IABUS 390. This address can be the address of an instruction that will be executed after CPU 300 finishes processing the instruction that was refetched from DISM 340. DISM 340 I/O 342 is coupled to IBUS 360 and can be output coupled to DBUS 370, allowing units coupled to DBUS 370, such as a Load/Store unit to read instructions in decoded form.

FIG. 3 is a simplified schematic diagram of portion 800 of the apparatus of FIG. 2 showing further details. Portion 800 has decrypted instruction storage memory (i.e.—DISM) 840, instruction address storage memory (i.e.—ASM) 830 and controller 790, analogous to DISM 340, ASM 330 and controller 350 of FIG. 2, respectively. Instruction bus (IBUS) 730, instruction address bus (IABUS) 740 and interrupt bus or line (INT) 735 are analogous to IBUS 360, IABUS 390 and INT 365, respectively, of FIG. 2. Portion 800 can optionally include auxiliary bus (AUXBUS) 710.

Controller 790 has I/O's 794, 796, 798. DISM 840 has instruction buffer (i.e.—IBUFF) 700, having/O 701 and C I/O's 704–709 which are connected to C memory words 7010, C preferably being an integer. DISM 840 has instruction multiplexer (i.e.—IMUX) 720, having C I/O's 724–729, I/O 722 and optional I/O 723. ASM 830 has an instruction address buffer (i.e.—ABUFF) 760, having I/O 761 and B I/O's 764–769 coupled to B memory words 7610, B being an integer. ASM 830 has instruction address multiplexer (i.e.—AMUX) 750, having B I/O's 754–759 and I/O's 751, 752.

I/O 721 of IMUX 720 is desirably coupled to an I/O of instruction register (i.e.—IREG) 780 via IBUS 730. AMUX 750 output 751 is desirably coupled to an I/O of instruction address register (i.e.—AREG) 770.

CI/O's 704–709 of IBUFF 700 are coupled to CI/O's 724–729 of IMUX 720. I/O 721 of IMUX 720 is coupled to IBUS 730. I/O 723 is optionally coupled to AUXBUS 710. I/O 722 of IMUX 720 and I/O 701 of IBUFF 700 are coupled to I/O 796 of controller 790. I/O 752 of AMUX 750 and I/O 761 of ABUFF 760 are coupled to I/O 798 of controller 790. I/O 794 of controller 790 is conveniently coupled to INT line or bus 735.

B I/O's 764–769 of ABUFF 760 are coupled to B I/O's 754–759 of AMUX 750. I/O 751 of AMUX 750 is coupled to IABUS 740 and is desirably coupled to I/O 772 of AREG 770.

If there is a need to refetch an instruction, controller 790 conveniently receives an interrupt state signal or flag via input 794 from INT line or bus 735 and outputs a signal, through I/O 796, to IBUFF 700 I/O 701 indicating that an instruction has to be read, and telling IMUX 720 which I/O out of C inputs/outputs 704–709 to choose. The instruction stored in one out of C memory words 7010 of IBUFF 700 which is coupled to the chosen I/O of IMUX 720 is outputted, through I/O 721 to IBUS 730 and optionally outputted, through I/O 723, to AUXBUS 710 and, conveniently, to IREG 780. Controller 790 can also output a signal, through output 798, to ABUFF 760 input 761 indicating that an instruction address needs to be read, and telling AMUX 750, via I/O 752, which I/O out of B inputs/outputs 754–759 to choose. The address of an instruction stored in one out of B memory words of ABUFF 760, which is coupled to chosen I/O of AMUX 750 is outputted, through I/O 751 of IMUX 750, to IABUS 740 and optionally to AREG 770.

The above described embodiment of the invention will be further understood by the following example:

A microprocessor portion, analogous to portion 800 of FIG. 3 is comprised of: an instruction buffer analogous to IBUFF 700 and having six memory words; a 6 to 1 multiplexer analogous to IMUX 720; an instruction bus analogous to IBUS 730; an instruction address bus analogous to IABUS 740; an instruction register analogous to IREG 780; an address instruction buffer analogues to ABUFF 760 having six memory words; a 6 to 1 multiplexer analogous to AMUX 750; an instruction address register analogous to AREG 770 coupled to the IBUS, and control logic analogous to controller 790.

The instruction buffer can store the last six instructions, fetched by the microprocessor is core sequencer. When one of the instructions has to be refetched, for example when it has been executed by the CPU and caused an exception or (e.g., an interrupt), then the control logic sends a signal indicating which of the 6 memory words of the instruction contains the instruction causing the exception. If, for example, the third instruction has to be fetched, the third input of the instruction multiplexer (IMUX) is enabled so that the content of the third memory word (i.e.—Inst.[3] in IMUX 720 of FIG. 3) of the instruction buffer (e.g. IBUFF 700) is outputted, through the instruction multiplexer to the instruction bus (e.g., IBUS 730), and can be outputted to auxiliary bus 710 and/or to the instruction register 780.

If execution of the instruction involves a change of microprocessor flow, the address buffer can output the address of an instruction that has to be executed after dealing with the exception, where the address is conveniently stored in the microprocessor program counter register.

If, for example, the microprocessor has to execute the fourth instruction, after dealing with an exception caused by the third instruction, then the fourth input of the instruction address multiplexer is enabled so that the content of the fourth memory word of the instruction address buffer is outputted, through the instruction address multiplexer to the instruction address bus.

Figure 4:
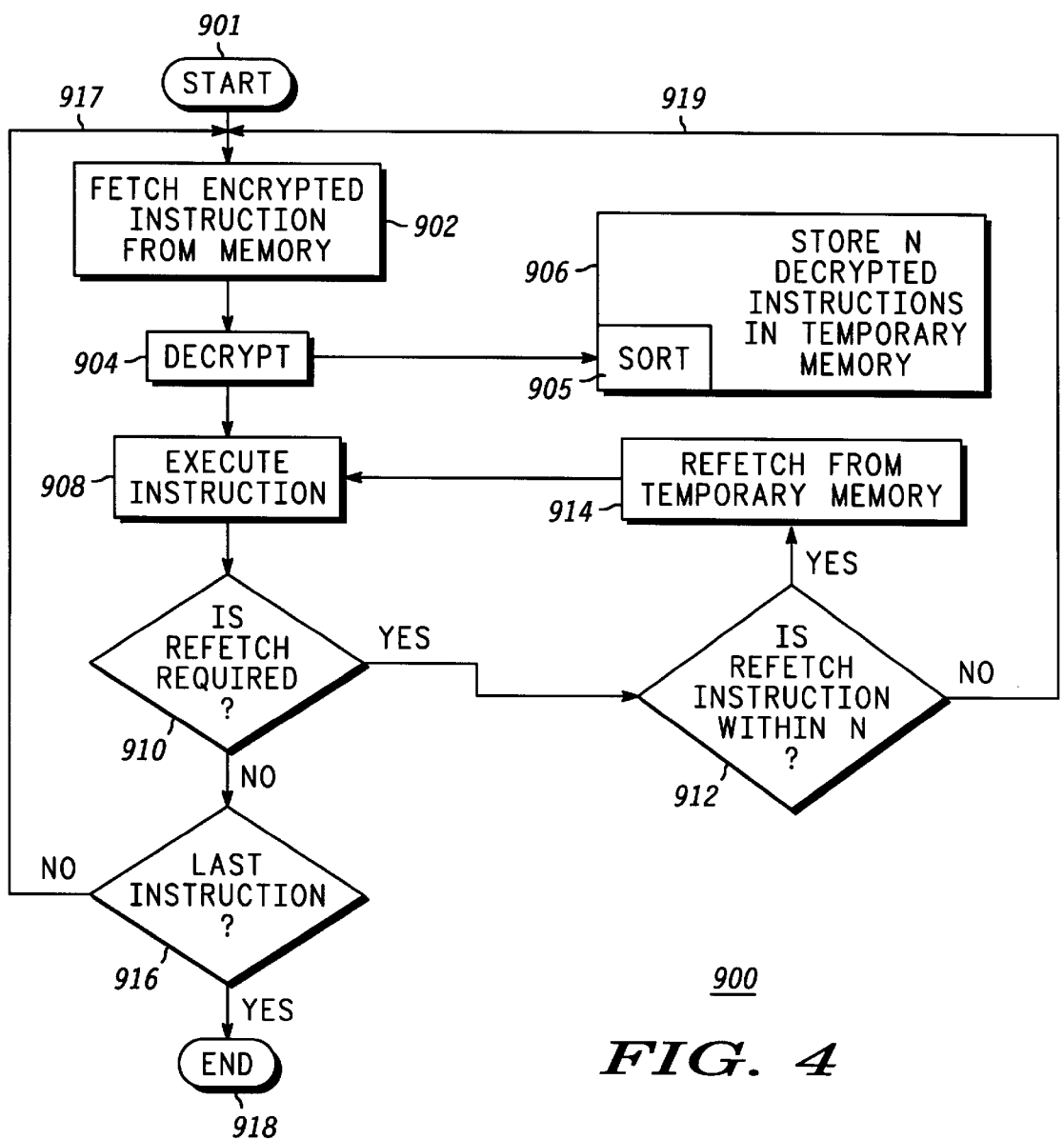
FIG. 4 is a simplified flow diagram of a method wherein instructions normally stored in coded form are refetched in decoded form, according to the present invention.

FIG. 4 is a simplified flow diagram of method 900 of storing and refetching coded instructions in decoded form, according to the present invention. Method 900 applies to situations where instructions are normally stored in coded form in memory and must be decoded before they can be executed. Coding is used for a variety of reasons, including compaction, as for example using a Hoffman Code.

Method 900 begins at 'START' 901 and in step 902 a coded instruction is fetched from the M coded instructions stored in the main memory, e.g., memory 40, 320. The fetched instruction is decoded in step 904. The decoded instruction is passed to temporary memory in step 906, e.g., memory 60, 340, 700, where a subset N of the fetched and decoded instructions is stored. This subset can be, for example, the last N instructions fetched and decoded, or the N instructions most likely to cause interrupts, or the N instructions likely to prompt a refetch cycle, or any other subset of N instructions likely to be used more than once during a particular operation of the computer system. The N instructions are stored in decoded form. In the preferred embodiment, the last N decoded instructions are stored but this is not essential.

Substep 905 is, conveniently, a select or sort step (e.g. performed by sorter 61) prior to store step 906 in which the desired subset of instructions to be stored in temporary memory 60, 340,700 is selected from the stream of instructions being fetched from memory 40, 320 and decoded in decoder 50, 310, in steps 902, 904 respectively. The subset of N decoded instructions to be stored in step 906 are preferably those that have a significant probability of being refetched. As those of skill in the art will understand, many different sort or selection methods can be used for selecting the N decoded instructions to be stored in step 906, depending upon the functions being executed by computer system 19, 21 and the nature of the instructions used. Based on the description herein, the details of performing such a sort or selection step are within the competence of persons of skill in the art.

In step 908 the fetched decoded instruction is executed. Query step 910 determines whether it is necessary to refetch an instruction, either the same instruction that was executed or another instruction. If the outcome of query step 910 is YES, then query step 912 determines whether the refetch instruction is within the N decoded instructions stored in the temporary memory in step 906. If the outcome of query step 912 is YES, then in step 914 the desired instruction is refetched from temporary memory 60, 340, 700 and returned for reexecution in step 908.

Query step 912 is not necessary in all situations. For example, where an instruction pipeline is used which contains N instructions and memory 60, 340 stores the last N instructions in decoded form, then a refetched instruction is always within the last N instructions and no query step 912 is needed. This is equivalent to a YES outcome of 912 and no other outcome is possible.

If the outcome of query step 910 is NO, then in query step 916 it is determined whether or not the instruction is the last instruction, and if the outcome of query step 916 is NO then the process loops back via 917 to fetch the next instruction, i.e., step 902 is repeated for the next instruction which is then decoded in step 904 and executed in 908, etc. The process repeats until all instructions have been executed, taking into account the possible outcomes of query step 910 as described above. Each time an instruction is decoded in step 904, store step 906 updates temporary memory 60, 340, 700, depending on the store criteria selected by the designer or user, e.g., last N instructions or instructions most likely to cause interrupts, etc.

Assume that query step 912 is needed, i.e., that it is possible for a desired refetch instruction to be outside the subset of N instructions stored in temporary memory 60, 340, 700. Then, query step 912 outcome is NO and the process loops back via 919 to refetch the encrypted instruction in step 902 and decode it in 904 before reexecuting it in step 908.

The process continues until the last instruction is reached (query step 916 output YES) whereupon the process ends at 918.

It will be understood by those skilled in the art that various changes in form and detail may be made without departing from the spirit and scope of the invention described in the claims that follow.

What is claimed is:

1. A computer system using encrypted instructions, comprising:
   a main memory that stores instructions in encrypted form to make the instructions opaque to unintended users, thereby obscuring meaning of the instructions to unintended users;
   a decoder coupled to the main memory, wherein the decoder decrypts encrypted instructions fetched from the main memory;
   a temporary memory coupled to the decoder that stores N decrypted instructions;
   a sorter coupled to the temporary memory for selecting the N decrypted instructions that are stored in the temporary memory as instructions that have a probability of being refetched;
   an instruction processor using decrypted fetched instructions; and
   a controller coupled to the main memory and the temporary memory, wherein the controller causes a requested instruction that is a previously executed instruction to be provided to the instruction processor in decrypted form from among the N decrypted instructions stored in the temporary memory.

2. The computer system of claim 1 wherein the sorter selects the N instructions most recently decoded by the decoder as the instructions which have the probability of being refetched.

3. The computer system of claim 1 wherein the controller determines whether a particular instruction needed by the instruction processor is within the N instructions stored in the temporary memory and, if YES, causes a fetch command to be sent to the temporary memory to retrieve the requested instruction in decrypted form for the instruction processor, and if NO, causes a fetch command to be sent to the main memory to retrieve the requested instruction in encrypted form and pass it through the decoder to place it in decrypted form for the instruction processor.

4. The computer system of claim 1 wherein the temporary memory and the instruction processor are coupled by an instruction bus and the temporary memory comprises:
   an instruction buffer coupled to the controller and having N memory words wherein each memory word stores one of the N instructions;
   a multiplexer coupled to the instruction buffer and the controller for selecting one of the N memory words;
   wherein when a decrypted instruction is provided by the decoder, it is fed to the buffer through the multiplexer to be written into one of the N memory words; and
   when a decrypted instruction needs to be refetched, the multiplexer couples a memory word containing the instruction needed to be refetched to the instruction bus for delivery of the refetched instruction to the instruction processor.

5. The computer system of claim 4 comprising a signal path for coupling a command to the multiplexer which identifies the instruction to be refetched.

6. A method for operating a computer system, comprising:
   a main memory that stores information words in encrypted form to make the instructions opaque to unintended users, thereby obscuring meaning of the instructions to unintended users;
   a decoder coupled to the main memory, wherein the decoder decodes encrypted information words from the main memory to form fetched decoded information words;
   a temporary memory coupled to the decoder that stores N fetched decoded information words in response to a sorter that selects the N fetched decoded information words for storage on a basis of having a probability of being refetched for additional processing;
   at least one peripheral coupled to the temporary memory for processing fetched decoded information words; and a controller coupled to the temporary memory and to the peripheral;

wherein when a previously fetched information word within the N information words is desired to be refetched, the controller retrieves from the temporary memory the desired previously fetched decoded information word and provides it to the peripheral for processing without passing the instruction through the decoder, and wherein when previously fetched information outside the N information words is desired to be refetched, the information desired to be refetched is retrieved from main memory and passed through the decoder before being provided to the peripheral for processing.

7. A method for processing encrypted instructions, comprising:

fetching an encrypted instruction from among M instructions stored in main memory, the encrypted instruction being encrypted to obscure meaning of information in the encrypted instruction opaque to unintended users;

decrypting the fetched instruction;

selectively storing the decrypted instruction among N<M instructions in a temporary memory where the N instructions are selectively stored on a basis of having a probability of needing to be refetched for additional processing;

executing the decrypted instruction; and determining if there is a need to refetch the instruction, and if 'YES' refetching the decoded instruction stored in the temporary memory.

8. The method of claim 7 wherein if the result of the determining step is 'NO', subsequent use of the instruction requires refetching and decrypting the instruction from main memory.

9. The method of claim 8 wherein the fetching, decoding and storing steps are repeated so that the N decrypted instructions stored in the temporary memory are the N most recently decrypted instructions.

* * * * *